3,803,327
PROCESS FOR PRODUCING PLASTEIN

Masao Fujimaki and Hiromichi Kato, Tokyo, Soichi Arai, Yokohama, and Michiko Yamashita, Fukuoka-machi, Japan, assignors to Idemitsu Petrochemical Co., Ltd., No Drawing. Continuation-in-part of abandoned application Ser. No. 92,516, Nov. 24, 1970. This application Jan. 11, 1973, Ser. No. 322,793
Int. Cl. C12d 1/00
U.S. Cl. 426—32                         1 Claim

ABSTRACT OF THE DISCLOSURE

A 10 to 60% aqueous solution of an oligo-peptide produced by hydrolyzing a protein 60–90% and having an average molecular weight of 1200 to 2000 is treated with an enzyme at about 37° C. for at least 8 hours and at a pH of 3 to 7. The enzyme is α-chymotrypsin, pepsin, neutral proteinase obtained from a strain of Rhizopus sp., subtilisin obtained from a strain of *Bacillus subtilis*, or *Aspergillo peptidase* A obtained from a strain of Aspergillus sp. The enzyme is preferably employed in an amount of 1 to 5 weight percent based on the weight of the oligo-peptide. Plasteins free from offensive taste and odor are obtained and may be used as foodstuffs.

---

This is a continuation-in-part of co-pending Ser. No. 92,516, filed Nov. 24, 1970, now abandoned, which claimed the priority of Japanese patent application No. 61,316/1970, filed July 15, 1970.

This invention relates to a process for producing in high yields plasteins which are free from offensive tastes and odors and are suitable for use as foodstuffs. More particularly, the invention pertains to a process for producing said plasteins in high yields by using as a starting material an oligo-peptide having an average molecular weight of 1,200 to 2,000 which is obtained by hydrolysis of a protein to a hydrolysis degree of 60 to 90%, forming the oligo-peptide to an aqueous solution having an oligo-peptide concentration of 10 to 60%, and then treating the aqueous oligo-peptide solution at about 37° C. for at least 8 hours at a pH in the range from 3 to 7 with an enzyme selected from the group consisting of α-chymotrypsin, pepsin, neutral proteinase obtained from a strain of Rhizopus sp., subtilisin and aspergillo peptidase A.

Generally, natural protein sources have peculiar tastes and odors and are, in most cases, not suitable for direct use as foodstuffs. For example, artificial foodstuffs produced from natural protein sources are low in palatability due to offensive tastes and odors derived from the starting natural protein sources, such as beany odor of soy protein and fishy odor of fish protein. Further, even when proteins obtained from said natural protein sources are purified by hydrolysis, the resulting peptides themselves have bitter tastes and hence are not suitable for use as foodstuffs.

Recently, attempts have been mode to utilize as foodstuffs the proteins obtained from petro-yeast proteins. In these attempts, however, there are such problems as the sanitation of the petro-yeast proteins themselves and such fear as the migration into the petro-yeast proteins of a carsinogen benzpyrene and the like harmful components contained in the petroleum.

The present invention aims to produce plasteins having no offensive tastes and odors and containing no harmful components from proteins obtained from natural protein sources and petro-yeasts, whose way of utilization as foodstuffs has heretofore been obstructed or narrowed for the above-mentioned reasons, and to utilize the plasteins as materials for artificial meats, reconstituted milks or enriching food additives.

Plasteins reaction processes for producing plasteins by polymerizing according to enzymatic reaction the peptides which are constitutive components of proteins are proposed in J. Am. Chem. Soc., 73, 1288 (1951) and J. Am. Chem. Soc., 73–2, 1288 (1952). In the processes proposed in said publishments, however, a protein is hydrolyzed to a peptide having an extremely low degree of bond, and this peptide is used as starting material and is subjected to plastein reaction. Accordingly, the yield of the resulting plastein is extremely low. Moreover, a long period of time is required for the hydrolysis of protein. For the above reasons, the said processes have not been utilized for commercial scale production of plasteins.

In the present invention, a protein obtained from a protein source is hydrolyzed to a hydrolysis degree of 60 to 90% to prepare as oligo-peptide having an average molecular weight of 1,200 to 2,000, and the thus prepared oligo-peptide is subjected to plastein reaction, whereby a plastein, which is free from offensive taste and odor and is suitable for use as a foodstuff, is obtained in a high yield and, moreover, the time required for the production of plastein can be greatly shortened. Thus, the industrial significance of the present invention is extremely great.

The hydrolysis degree of protein referred to herein shows the proportion of a 10% aqueous trichloroacetic acid-soluble peptide fraction in the hydrolyzate of protein, and is a value calculated according to the following equation:

Hydrolysis degree $$= \frac{\text{Amount of nitrogen in 10\% aqueous trichloroacetic acid-soluble fraction}}{\text{Total nitrogen}} \times 100(\%)$$

The 10% aqueous trichloroacetic acid-soluble fraction is an oligo-peptide having an average molecular weight of 2,000 or less, particularly 1,200 to 2,000, while the 10% aqueous trichloroacetic acid-insoluble fraction is an oligo-peptide having an average molecular weight of more than 2,000. These oligo-peptides polymerize according to plastein reaction to form a plastein. The yield of plastein is particularly high in the case of a hydrolyzate having a hydrolysis degree in the range of 60 to 90% which contains a large amount of the oligo-peptide having an average molecular weight of 1,200 to 2,000. In case the hydrolysis degree is less than 60%, a large amount of an oligo-peptide having an average molecular weight of more than 2,000 is formed, while in case the hydrolysis degree exceeds 90%, the amount of an oligo-peptide having an average molecular weight of less than 1,200 becomes larger. In both cases, the yield of plastein is lowered.

Protein sources usable in the present invention include vegetable proteins such as soybean protein and wheat gluten, animal proteins such as codfish protein and pig hemogrobin, and microbial proteins such as petro-yeast proteins.

Examples of the enzyme used in the present invention include α-chymotrypsin, pepsin, neutral proteinase obtained from a strain of Rhizopus sp., subtilisin obtained from a strain of *Bacillus subtilis*, and *Asperogillo peptidase* A obtained from a strain of Aspergillus sp. The amount of the enzyme to be added is 1 to 5% by weight based on the weight of the oligopeptide used.

In practicing the present invention, a protein is first extracted from a protein source by use of an aqueous alkali hydroxide solution or the like. Subsequently, the extract is adjusted to an acidic pH, and is then hydrolyzed with pepsin or the like enzyme to a hydrolysis degree of 60 to 90%, preferably about 80%. Thereafter, the hydrolyzate is washed with an organic solvent such as ether or the like, and is then concentrated under reduced pressure, so that the concentration of oligo-peptide having an average molecular weight of 1,200 to 2,000 becomes 10 to 60%, preferably 20 to 40%. To the resulting aqueous oligo-peptide solution is added an enzyme selected from the group consisting of α-chymotrypsin, pepsin, neutral proteinase obtained from a strain of Rhizopus sp., subtilisin and *Aspergillo peptidase* A. Thereafter, the solution is adjusted to such a pH value suitable for each enzyme as shown in Table 1, and is then incubated at about 37° C. for at least 8 hours.

TABLE 1

| Enzyme: | Optimum pH value |
|---|---|
| α-Chymotrypsin | 5–7 |
| Pepsin | 4–5 |
| Neutral proteinase | 3–6 |
| Subtilisin | 5–7 |
| Aspergillo peptidase A | 4–6 |

After completion of the plastein reaction, an alcohol or acid is added to the reaction product to gel the plastein, which is then separated and recovered by use of a centrifugal separator or the like.

The thus obtained plastein has a molecular weight within the range from 10,000 to 20,000, and the general composition, nutritional value, essential amino acid pattern and digestibility thereof are substantially identical with those of the starting protein. However, the plastein has such acceptability as being colorless, tasteless and odorless. For use as a foodstuff, therefore, the plastein is properly seasoned or is added for the purpose of enrichment to other foodstuff. Furthermore, the plastein does not contain harmful substances contained in the starting material and scarcely contain fats, so that it shows a high storage stability without suffering from rancid flavor or browning due to oxidation of fats.

The present invention is illustrated in detail below with reference to examples.

EXAMPLE 1

To 300 g. of defatted soybean was added 3 liters of water to extract a soybean protein. The extract was adjusted to pH 4.5 by addition of hydrochloric acid, whereby the soybean protein was precipitated. The precipitated protein was separated by use of a centrifugal separator to obtain 100 g. of soybean protein. The thus obtained soybean protein was dissolved in 10 liters of dilute hydrochloric acid at pH 2, and the resulting solution was adjusted to pH 1.6 by addition of a small amount of concentrated hydrochloric acid. Subsequently, the solution was equally divided into 5 portions to form 5 solutions. Each of the thus formed solutions was incorporated with 1 g. of pepsin (prepared by recrystallizing pepsin produced by Sigma Chemical Co.), and then successively hydrolyzed at 37° C. over 8, 10, 12, 15 and 48 hours to form 5 aqueous solution of soybean protein hydrolyzates having hydrolysis degrees of 60%, 70%, 80%, 90% and 98%, respectively. Each of the 5 aqueous solutions was washed 3 times with 10 liters of ether, and then concentrated under reduced pressure at 30° to 50° C. to form 6 aqueous solutions having oligo-peptide concentrations of 10%, 20%, 30%, 40%, 50% and 60% by weight, respectively.

In the above manner, a total of 30 kinds of aqueous soybean hydrolyzate solutions were obtained. Each of these solutions was adjusted to pH 7.0 by addition of sodium hydroxide, incorporated with 1 g. of α-chymotrypsin (prepared by recrystallizing α-chymotrypsin produced by Sigma Chemical Co.) as a plastein synthesis enzyme, and then incubated at 37° C. for 24 hours to form a plastein. Each reaction product containing the thus formed plastein was gradually charged with 99% purity ethanol so as to attain a final ethanol concentration of 95%. The resulting plastein gel was separated by means of a centrifugal separator, and was then dried to obtain a powdery plastein excellent in palatability.

The yields of plasteins obtained from the above-mentioned 30 kinds of aqueous soybean protein hydrolyzate solutions were as set forth in Table 2.

TABLE 2

| | Hydrolysis degree (percent) | | | | |
|---|---|---|---|---|---|
| | 60 | 70 | 80 | 90 | 98 |
| | Average molecular weight | | | | |
| | 2,000 | 1,800 | 1,500 | 1,200 | 1,000 |
| Peptide concentration (percent): | Plastein yield (percent) | | | | |
| 10 | 47 | 38 | 29 | 34 | 5 |
| 20 | 70 | 77 | 80 | 69 | 31 |
| 30 | 66 | 80 | 89 | 72 | 40 |
| 40 | 55 | 70 | 91 | 63 | 39 |
| 50 | 49 | 50 | 55 | 45 | 30 |
| 60 | 38 | 38 | 28 | 32 | 24 |

From Table 2, it is understood that the maximum plastein yield is attained when the hydrolysis degree of protein is 80%, and that particularly favorable results are obtained when the oligo-peptide concentration is in the range from 20 to 40%. It is also understood that the yield of plastein obtained from the control aqueous protein solution having a hydrolysis degree of 98% is considerably low.

Properties of the plastein obtained in this example from the aqueous protein solution having a hydrolysis degree of 80% and an oligo-peptide concentration of 20% were as shown below.

(A) General composition:

| | Percent |
|---|---|
| Protein | 85.5 |
| Saccharide | 8.6 |
| Fat | 0.0 |
| Ash | 2.5 |
| Moisture | 3.4 |

(B) Acceptability:

Colorless, tasteless and odorless.

(C) Digestibility:

Digestibility in vitro with pepsin and trypsin in identical with that of denatured soybean protein. Digestibity shown by rat experiment was 90.3%.

(D) Nuritional value:

| | |
|---|---|
| Milk score | 79 |
| Human milk score | 77 |
| Egg score | 57 |
| Biological value | 66.8 |

(E) Essential amino acid pattern:

Identical with that of the starting soybean protein.

EXAMPLE 2

Soybean protein was hydrolyzed in the same manner as in Example 1 to form an aqueous oligo-peptide (average molecular weight 1,500) solution having a hydrolysis degree of 80%. This solution was used to produce plasteins in the same manner as in Example 1, using such 5 kinds of plastein synthesis enzymes as the same α-chymotrypsin and pepsin as used in Example 1, Coronase (produced by Wakamoto Seiyaku Co.) as neutral proteinase obtained from a strain of Rhizopus sp., Bioprase (produced by Nagase Sangyo Co.) as subtilisin, and Molsin (produced by Seishin Seiyaku Co.) as aspergillo peptidase A. The yields of the thus obtained plasteins were as set forth in Table 3.

TABLE 3

| | | Peptide concentration (percent) | | | | | |
|---|---|---|---|---|---|---|---|
| | | 10 | 20 | 30 | 40 | 50 | 60 |
| Enzyme | pH | Plastein yield (percent) | | | | | |
| α-Chymotrypsin | 5.0 | 66 | 84 | 86 | 92 | 90 | 82 |
| Pepsin | 5.0 | 67 | 85 | 87 | 93 | 91 | 82 |
| Neutral proteinase | 4.0 | 54 | 68 | 69 | 74 | 73 | 66 |
| Subtilisin | 6.0 | 49 | 62 | 67 | 72 | 71 | 64 |
| Aspergillo peptidase | 6.0 | 42 | 65 | 72 | 77 | 74 | 51 |

EXAMPLE 3

To 400 g. of a petro-yeast of the genus Torula was added water to form a paste, which was then mixed with 400 g. of sea sand. The resulting mixture was ground and then charged with 3 liters of 0.5 N-sodium hydroxide to extract a petro-yeast protein. The extract was neutralized with hydrochloric acid and saturated with ammonium sulfate to salt out the petro-yeast protein. This protein was further desalted by dialysis in running water for 2 days to obtain 100 g. of the protein. The thus obtained petro-yeast protein was hydrolyzed in the same manner as in Example 1 to a hydrolysis degree of 80%, and was then used to produce plasteins using $\alpha$-chymotrypsin and pepsin. The yields of the thus obtained plasteins were as set forth in Table 4.

TABLE 4

| Ezyme | Ph | Peptide concentration (percent) | | | | | |
|---|---|---|---|---|---|---|---|
| | | 10 | 20 | 30 | 40 | 50 | 60 |
| | | Plastein yield (percent) | | | | | |
| $\alpha$-Chymotrypsin | 5.0 | 64 | 83 | 87 | 93 | 91 | 83 |
| Pepsin | 5.0 | 63 | 83 | 87 | 93 | 92 | 84 |

The thus obtained plasteins are slightly cream-colored powders which are completely free from the fermentation odor peculiar to the starting petro-yeast and are tasteless and odorless.

What we claim is:

1. A process for producing plasteins which are free from offensive tastes and odors and are suitable for use as foodstuffs, characterized in that an oligo-peptide having an average molecular weight of 1,200 to 2,000 which is obtained by hydrolyzing a protein to a hydrolysis degree of 60 to 90% is used as a starting material and is formed into an aqueous solution having an oligo-peptide concentration of 10 to 60%, and the aqueous oligo-peptide solution is treated at about 37° C. for at least 8 hours at a pH in the range from 3 to 7 with an enzyme selected from the group consisting of $\alpha$-chymotrypsin, pepsin, neutral proteinase obtained from a strain of Rhizopus sp., subtilisin and aspergillos peptidase A.

References Cited

Journal of the American Chemical Society, vol. 73, No. 2, pp. 1288–1290; 1952.

LIONEL M. SHAPIRO, Primary Examiner

R. J. WARDEN, Assistant Examiner

U.S. Cl. X.R.

426—44, 46, 55, 7; 195—29